United States Patent
Voogd et al.

(10) Patent No.: US 6,619,228 B2
(45) Date of Patent: Sep. 16, 2003

(54) DEVICE FOR AUTOMATICALLY SUPPLYING A PREDETERMINED AMOUNT OF AT LEAST ONE SORT OF FEED TO AN ANIMAL IN A PREDETERMINED PERIOD

(75) Inventors: Lucien Eliza Niels Voogd, Leerdam (NL); Karel van den Berg, Bleskensgraaf (NL)

(73) Assignee: Lely Enterprises AG, Butzenweg (CH)

( * ) Notice: Subject to any disclaimer, the term of this patent is extended or adjusted under 35 U.S.C. 154(b) by 0 days.

(21) Appl. No.: 10/261,678

(22) Filed: Oct. 2, 2002

(65) Prior Publication Data

US 2003/0061998 A1 Apr. 3, 2003

(51) Int. Cl.$^7$ ................................................ A01K 5/02
(52) U.S. Cl. ................................ 119/51.02; 119/51.12; 119/51.13
(58) Field of Search .................... 119/51.01, 51.02, 119/51.11, 51.12, 51.13, 52.1, 52.4, 53, 14.03, 14.18

(56) References Cited

U.S. PATENT DOCUMENTS

| | | | | |
|---|---|---|---|---|
| 4,461,241 A | * | 7/1984 | Ostler | 119/51.02 |
| 4,463,353 A | * | 7/1984 | Kuzara | 340/10.34 |
| 4,532,892 A | * | 8/1985 | Kuzara | 119/51.02 |
| 5,012,762 A | * | 5/1991 | Moskvin | 119/14.18 |
| 5,050,537 A | * | 9/1991 | Fox | 119/51.02 |
| 5,205,240 A | * | 4/1993 | Colas et al. | 119/57.4 |
| 5,355,833 A | * | 10/1994 | Legrain | 119/51.02 |
| 5,424,957 A | * | 6/1995 | Kerkhoff et al. | 700/240 |
| 5,457,627 A | * | 10/1995 | Cureton et al. | 705/34 |
| 5,533,648 A | * | 7/1996 | Read et al. | 222/108 |
| 5,551,374 A | * | 9/1996 | Wells | 119/71 |
| 5,778,820 A | | 7/1998 | van der Lely et al. | 119/14.18 |
| 5,988,106 A | * | 11/1999 | van den Berg | 119/51.02 |
| 6,443,093 B1 | * | 9/2002 | van der Lely et al. | 119/14.01 |
| 6,510,815 B1 | * | 1/2003 | Lagardere | 119/230 |
| 6,516,746 B2 | * | 2/2003 | Pratt | 119/51.02 |

FOREIGN PATENT DOCUMENTS

| | | |
|---|---|---|
| FR | 7702576 | 8/1978 |
| FR | 8115613 | 2/1983 |
| NL | 1010898 | 6/2000 |
| WO | PCT/NL95/00217 | 6/1995 |
| WO | PCT/NL99/00637 | 10/1999 |

\* cited by examiner

Primary Examiner—Yvonne Abbott
(74) Attorney, Agent, or Firm—Penrose Lucas Albright

(57) ABSTRACT

A device for automatically supplying a predetermined amount of at least one sort of feed to an animal in a period having a predetermined length. The device is provided with a feeding parlour, with an animal identification system for identifying an animal present at the feeding parlour, and with a computer for controlling the device for automatically supplying the at least one sort of feed to the feeding parlour. The computer is suitable for determining the sub-period between the last supply of feed to an animal and the momentary point of time when the animal is identified by the animal identification system at the feeding parlour. The computer controls the device in such a way that, during the momentary visit of the animal to the feeding parlour, there is supplied to the animal a feed balance, the size of the feed balance depending on the determined sub-period.

37 Claims, 8 Drawing Sheets

DEVICE FOR AUTOMATICALLY SUPPLYING A PREDETERMINED AMOUNT OF AT LEAST ONE SORT OF FEED TO AN ANIMAL IN A PREDETERMINED PERIOD

The invention relates to a device for automatically supplying a predetermined amount of at least one sort of feed to an animal in a period having a predetermined length according to the preamble of claim 1.

Such a device is known per se.

It is an object of the invention to provide a device for automatically supplying a predetermined amount of at least one sort of feed to an animal in a period having a predetermined length, by means of which the supply of feed over said predetermined period, for example one day or the period defined by the visit of a predetermined number of animals (for example 40) to the feeding parlour, takes place efficiently. Hereby is meant inter alia that no unnecessary waste of feed occurs, while sufficient nutritive substances are supplied to the animal.

According to the invention, for that purpose a device of the above-described type comprises the measures of the characterizing part of claim 1. Due to this there is supplied to an animal a feed balance which depends on, preferably is proportional to, the sub-period which has elapsed since the last feeding of the animal. This makes it possible for the animal to obtain a uniform supply of feed, which appears to be extremely efficient.

In an embodiment of a device according to the invention, the device is suitable for automatically supplying the predetermined amount of at least one sort of feed in a period of time having a predetermined length, the computer being provided with a clock for determining per animal the point of time of supply of feed, the computer being suitable for determining the sub-period as being the time interval between the last supply of feed to an animal and the momentary point of time when the animal is identified by the animal identification means at the feeding parlour.

An embodiment of a device according to the invention is characterized in that the computer is provided with a memory in which are stored correspondence tables containing the size of the feed balance per animal per sub-period. This makes it possible to determine in a simple manner the feed balance belonging to a determined sub-period.

Alternatively or additionally the computer may be provided with a calculating device for making a division of the predetermined amount of sort of feed by the predetermined period resulting in a sort-of-feed quotient, and in that the calculating device determines the product of the sub-period and the sort-of-feed quotient resulting in the feed balance. Due to this the memory capacity can remain limited.

It is possible to supply the feed balance to the animal in one time. However, this has the disadvantage that it may happen that an animal cannot eat up the entire feed balance, for example due to the fact that it is jostled from the feeding parlour by another animal. Accordingly, in an embodiment of a device according to the invention, the computer controls the device in such a way that the feed balance is supplied to the animal in feed portions. When a feed portion is not eaten up by the relevant animal, the computer is capable of controlling the relevant components in such a way that no possible further feed portions are supplied.

Depending on the measurement accuracy of the relevant device it is preferred when a feed portion has at least a minimum feed portion size. As a result thereof measurement errors in the case of too small portion sizes, which may result in an inaccurate feeding, are at least avoided to it considerable extent.

Although the feed portion size may have a previously adjusted value, it is preferred when the calculating device of the computer calculates a calculated feed portion size of the feed portions. As a result thereof the feed portion size can be adjusted per animal and possibly depending on the prevailing circumstances. It appears to be extremely suitable when the calculated feed portion size is approximately 5% of the feed balance.

In order not to discourage an animal to come to the feeding parlour, in an embodiment of a device according to the invention, the computer is provided with a comparing device for comparing the calculated feed portion size with the minimum feed portion size, while, when the comparison result indicates that the calculated feed portion size is smaller than the minimum feed portion size, the computer controls the device in such a way that one minimum feed portion size is supplied to the animal. Thus there is always supplied a minimum feed portion to the animal.

Depending on grazing and/or, when the animal is a dairy animal, depending on the last time the dairy animal has been milked or the time when it is expected to be milked again, the animal should not be fed. In an embodiment of a device according to the invention, this is realised in that there is included a blocking time in the memory, the computer only controlling the device for supplying a sort of feed to the animal after, counted from the last point of time of supply of feed to the animal, the blocking time has elapsed. Said blocking time may have a fixed value or be dynamic, i.e. variable.

In order to be able to check whether the animal actually visits the feeding parlour for eating, when an animal is identified by the animal identification means at the feeding parlour, the computer controls the device in such a way that first one minimum feed portion size is supplied to the animal. When the animal leaves the feeding parlour after the supply of said feed portion, no further portions are supplied. This has also the advantage that an animal can eat immediately and has not to wait too long until the relevant feed has been composed.

In a further embodiment of a device according to the invention, there is included in a memory of the computer a minimum and a maximum for the amount of a sort of feed to be supplied. The minimum may also be a negative value, so that an animal can actually consume more of the sort of feed than determined by the predetermined amount for that predetermined period. The maximum may have a very high value, which implies that a sort of feed can be supplied to a substantially unlimited extent. The latter may for example be the case for a sort of feed constituting a so-called calming component, such as for example ensilaged grass.

Also when an animal does not consume feed during its visit to the feeding parlour, it is advantageous when the computer stores the points of time when an animal leaves the feeding parlour in the memory. Said points of time may be used for (example for behavioural study, but may also be an indication about the state of health of the animal.

In a further embodiment of a device according to the invention, the device is provided with measuring means for measuring the weight of the feed in the feeding parlour. This makes it possible to determine the amount of a sort of feed consumed by an animal. The measuring means may comprise a weighing device for weighing the amount of feed in the feeding parlour, although other means, such as picture recognition equipment, may also be applied. It is then also possible that the computer stores data in relation to the amount of remaining feed in a feed trough in the memory The calculating device can take this value for the remaining feed into account when determining the feed balance. The feed balance is in particular determined as being the product of the sub-period and the sort-of-feed quotient, which product is reduced by the amount of remaining feed.

In order to take remaining feed present in a feeding parlour further into account, in an embodiment of a device according to the invention, the computer is provided with a comparing device for comparing the amount of remaining feed with a minimum threshold value, the computer only controlling the device for supplying feed in the feeding parlour when the comparison indicates that the amount of remaining feed is below the minimum threshold value.

The device is preferably suitable for automatically supplying several sorts of feed to an animal in a predetermined period. The device may then be provided with a mixing device for mixing the sorts of feed before these sorts of feed are supplied to the feed trough. Alternatively the computer controls the device in such a way that at least one (preferably all) sort(s) of feed is/are supplied at least substantially separately from the other sorts of feed (from each other) to the feeding parlour.

In an embodiment of a device according to the invention, when the comparison result indicates that the calculated feed portion size for a particular sort of feed is smaller than the minimum feed portion size for that sort of feed, the computer controls the device in such a way that one minimum feed portion size composed of the other sorts of feed is supplied to the animal. The lacking sort of feed can then be supplied at a next visit of the animal to the feeding parlour, at least if the minimum portion size is then exceeded.

In order immediately to supply feed to an animal reporting for the first time at a feeding parlour of a device provided with several feeding parlours, the computer controls the device in such a way that first feed is supplied to that feeding parlour where an animal has been identified most recently by the animal identification means.

The device according to the invention is preferably provided with at least one milking box with a milking robot for automatically milking a dairy animal, the milking box being provided with a feeding station with a feed trough. Alternatively or additionally the device is provided with at least one feeding column (placed outside the milking box) with a feet trough. When the device comprises at least one milking box and at least one feeding column, the computer in particular controls the collective supply of feed by the feeding station(s) and the feeding column(s) in such a way that the predetermined amount of feed is supplied to an animal in the predetermined period.

In a further embodiment of a device according to the invention, the feeding station respectively the feeding column is suitable for automatically supplying at least two sorts of feed, the device being provided with parameter-measuring means for measuring a momentary value of a variable parameter (animal-dependently or animal-independently) and for issuing a parameter value signal to the computer, the computer controlling the feeding station respectively the feeding column by means of a control signal in such a way that sorts of feed are supplied in a particular amount and in a particular ratio collectively respectively as a mixture, the computer being provided with a processing device for processing the parameter value signal into the control signal. This embodiment of a device according to the invention is based on the insight that the feed intake of the animals appears to depend on certain varying circumstances. Further, for example the amount and the quality of milk produced by a dairy animal appear to depend on certain varying circumstances. According to the invention this is improved by automatically measuring, with the aid of parameter-measuring means, the momentary value of such a circumstance, called the variable parameter, and by processing the corresponding parameter value signal into the control signal. Thus it is possible to take the change in the parameter Automatically into account when supplying feed. Moreover this can make it more attractive for an animal to consume more feed.

The parameter measuring means are in particular selected from the group composed of atmospheric-condition measuring means for measuring the atmospheric conditions, a clock for measuring the point of time of the day, a clock for measuring the period of the year, means for measuring the condition score of an animal, means for determining per animal the eating rate per sort of feed, means for measuring per animal the milk yield, means for measuring the amount of protein and/or fat and/or minerals and/or amino acids or the like in the milk obtained from that animal, and means for measuring the amount of a sort of feed consumed by an animal.

In an advantageous embodiment of a device according is to the invention, the feeding station respectively the feeding column is provided with a receptacle, the conveying means comprising a first conveyor for conveying an amount of feed from the hopper to the receptacle and a second conveyor for conveying the amount of feed from the receptacle to a feed trough. The receptacle is preferably provided with a weighing device for measuring feed present in the receptacle. This makes it possible to determine the amount of feed to be supplied to the feed trough.

Although the feed can be taken out of the receptacle by means of a separate taking-out device, for the sake of simplicity of the construction it is advantageous when there is not used a separate device for taking out. There may be used a tiltable receptacle, feed falling from said receptacle after the latter has been tilted. However, for improving the hygienic use of the feeding station respectively the feeding column, it is preferred when the receptacle has a bottom which is designed to be opened. The receptacle is preferably provided with a control device for controlling the opening of the bottom. It has appeared to be particularly suitable when the second conveyor is constituted by a tube-shaped chute respectively a channel-shaped chute.

In order to prevent that an animal keeps waiting at a feeding trough after having been fed, in an embodiment of a device according to the invention, the feed trough is constituted by a feed trough capable of being closed by a closing meals, the control device also being suitable for controlling the operation of the closing means.

The predetermined period, for example 24 hours or the period in which a particular number of animals has visited the feeding parlour, can be measured from a fixed point of time of the day, for example 0:00 AM. However, alternatively it is possible to distribute the amount of feed to be supplied over a so-called sliding window. Such a sliding window is preferably formed in that the predetermined period immediately precedes the momentary point of time when an animal is present at the feed trough.

In a further embodiment of a device according to the invention, the predetermined length of the period is animal-dependent and/or lactation-period-dependent and/or season-dependent and/or weather-dependent. As a result thereof an optimal supply of feed per animal can be obtained.

The invention will now be explained in further detail with reference to an embodiment shown in the drawing, in which.

Figure 6:
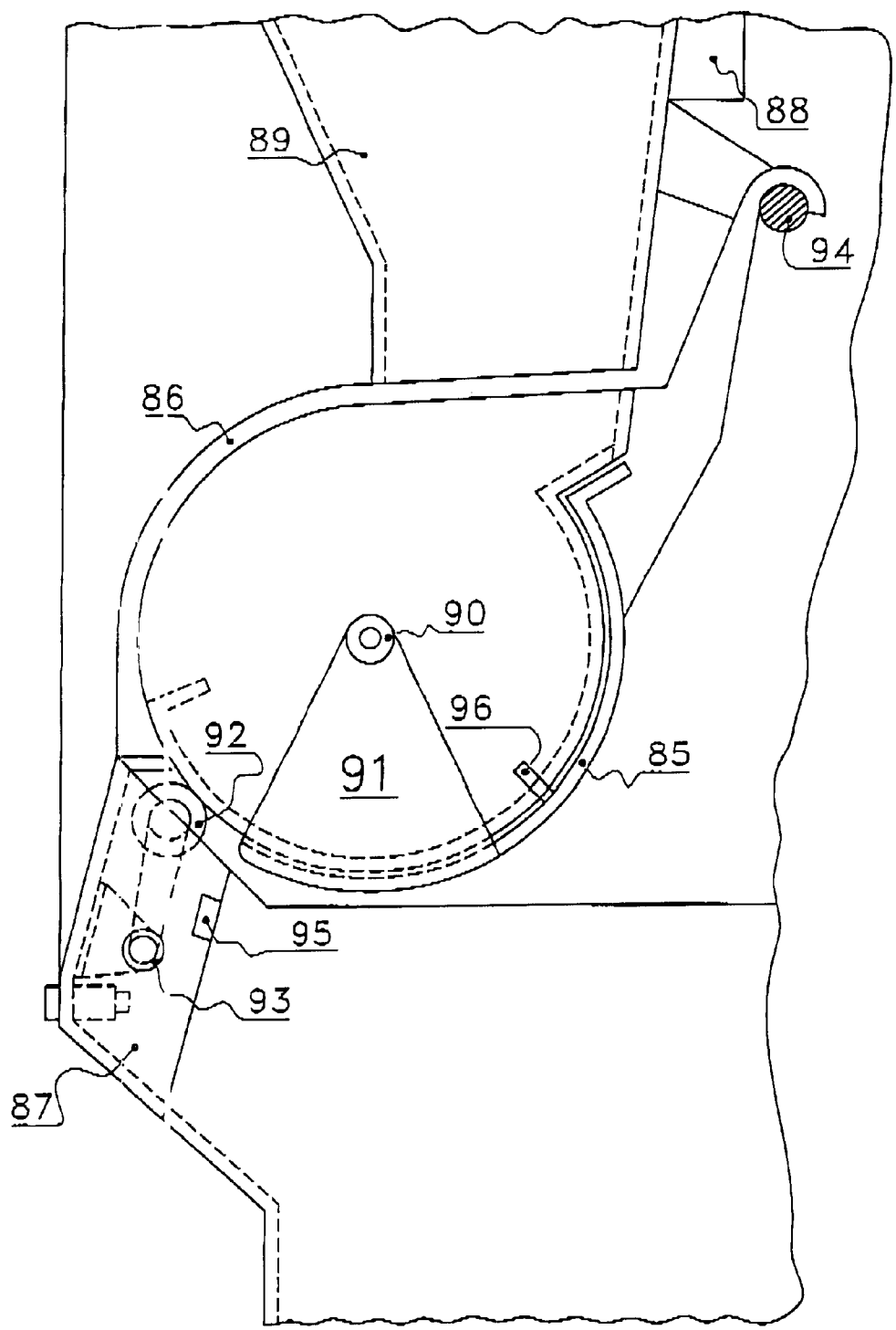
Figure 7:
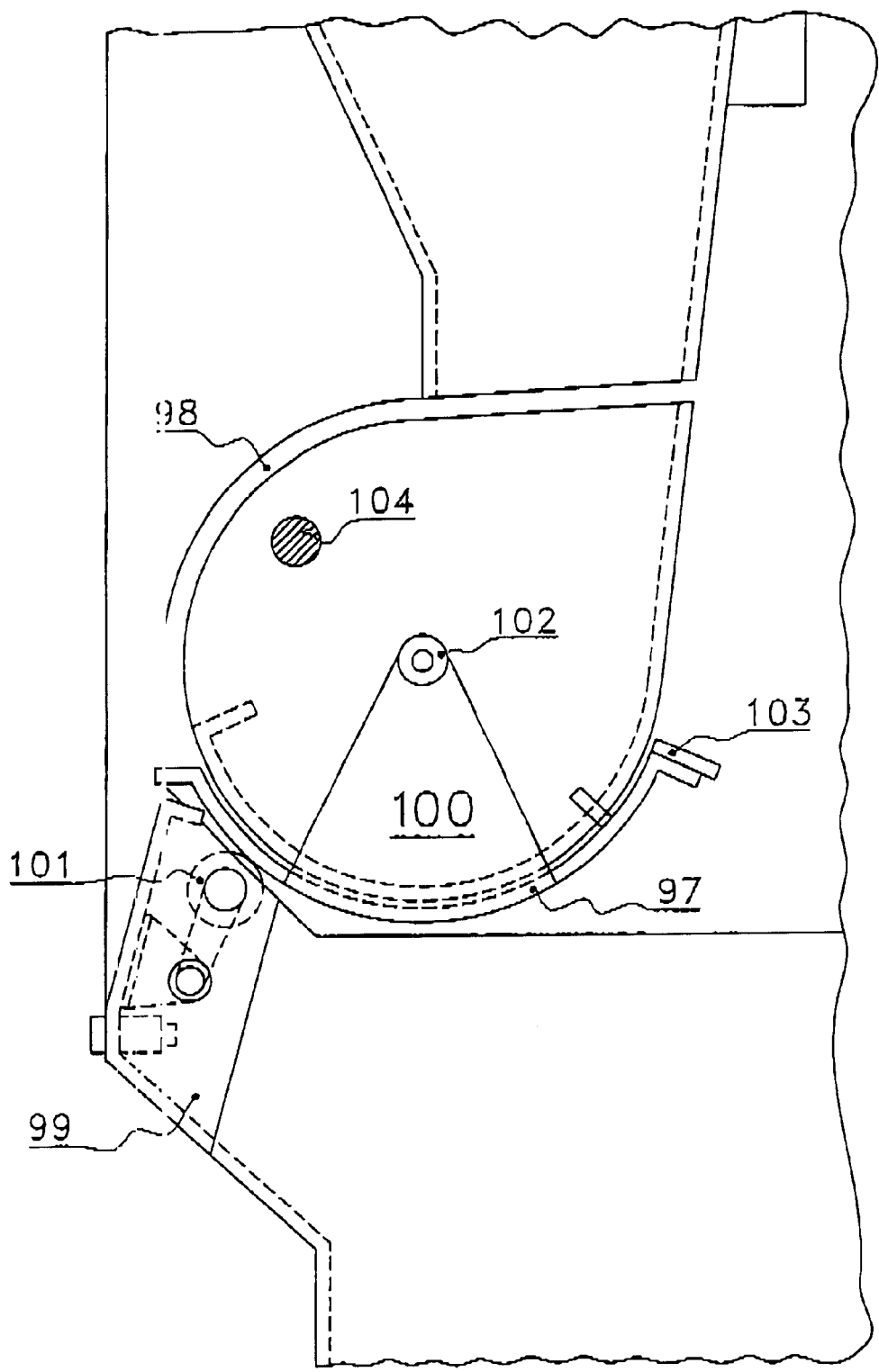
Figure 8:
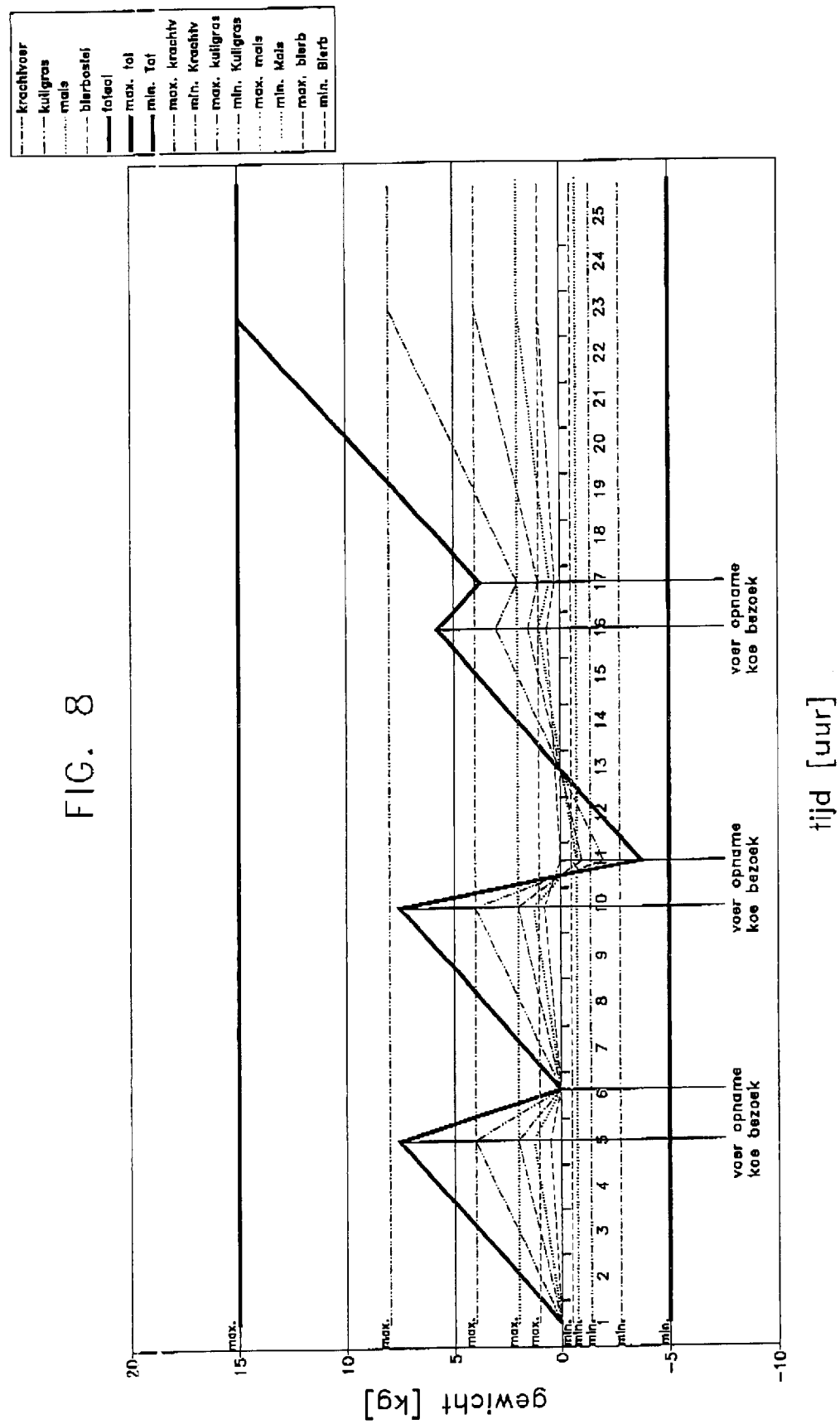

FIG. 6 shows a fourth embodiment of means for measuring the amount of a sort of feed consumed by an animal in a feeding column respectively a feeding station according to the invention, and FIG. 7 shows a fifth embodiment of means for measuring the amount of a sort of feed consumed by an animal in a feeding, column respectively a feeding station according to the invention, and FIG. 8 shows a graph indicating the feed composition per unit of time for four sorts of feed.

Figure 1:
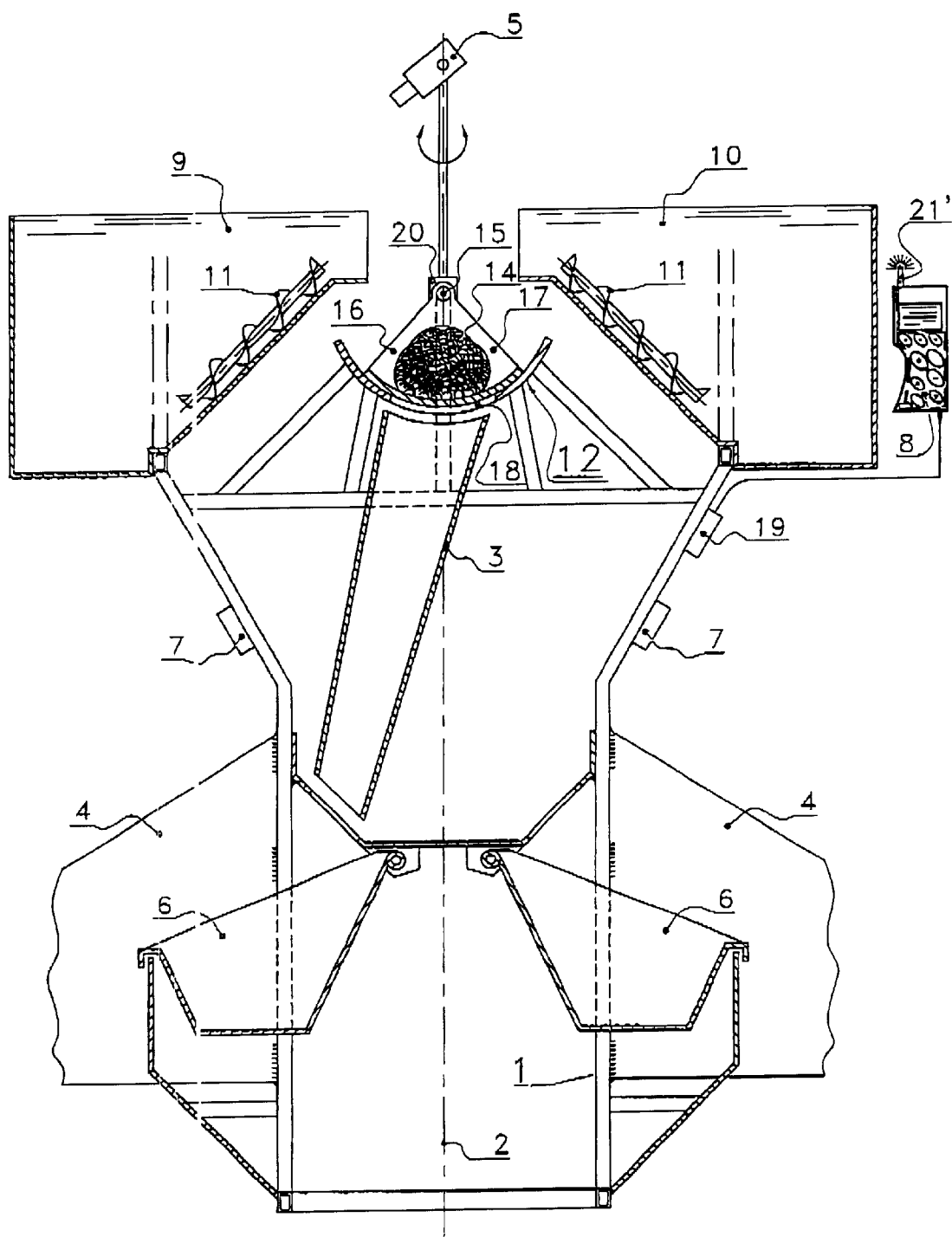
FIG. 1 is a schematic cross-sectional view of a device according to the invention in the form of a feeding column.

FIG. 1 shows an embodiment of a device according to the invention in the form of a feeding column with a feed trough. However, it will be obvious that the invention can also be applied in feeding parlours having another construction than a feeding column with a feed trough. A framework 1, having a substantially circular circumference, is disposed around a central axis 2. A number of hoppers 9, 10 (two of which shown in the drawing) are located at the upper side of the framework 1. For the installation of the hoppers 9, 10 there are made not further shown provisions on the framework 1. Each hopper 9, 10 contains a particular sort or feed.

The framework 1 is provided with partitions 4 which are detachably disposed on the framework 1.

Feed troughs 6 for the animals are disposed in a circular arrangement in the lower part of the feeding column. By means of the geometry of the feeding column it is achieved that the construction occupies little space, while the accessibility of the feeding column to the animals is optimal from all directions.

The feeding column further comprises conveying means comprising a first conveyor 11 and a second conveyor 3 for conveying feed from the hopper 9, respectively 10 to the relevant feed trough 6. The feed can be conveyed directly from the hoppers 9, 10 to the feed troughs 6. In the embodiment shown there is provided a receptacle 12, for example centrally located, receiving an amount of feed conveyed by the first conveyor 11 from the hopper 9, 10 to the receptacle 12. As a first conveyor 11 an auger, gripper, conveyor belt, or any other construction known per se for conveying feed, can be used.

A second conveyor 3, preferably constituted by a tube-shaped chute respectively a channel-shaped chute, is suitable for conveying the amount of feed from the receptacle 12 to the relevant feed trough 6. For conveying the feed to the relevant feed trough 6 it is advantageous when the tube-shaped chute 3 is rotatably mounted in the feeding column. The tube-shaped chute respectively the channel-shaped chute is preferably made of stainless steel.

The feeding column is provided with a second control device 19. The second control device 19 controls under control of a computer 8 (for example interconnected by means of a line) the components of the feeding column in such a way that sorts of feed are supplied in a particular order and/or ratio and in a particular amount to the feed trough 6.

The feeding column may be provided with feed-determining means 5 for determining the sort of feed in a hopper 9, 10. Such feed-determining means may comprise for example an olfactometer, a colour meter or picture recognition equipment (such as described for example in U.S. Pat. No. 4,843,561).

For the purpose of conveying an amount of a sort of feed 14 to the tube-shaped chute 3, the receptacle 12 has a bottom which is designed to be opened. In the embodiment shown this is realised in that the bottom of the receptacle 12 has two halves 16 and 17 which are pivotable about an axis 15. When the halves 16, 17 move away from each other, there is thus created a chute aperture 18 through which the amount of sort of Seed 14 falls into the tube-shaped chute 3.

The second control device 19, although another (fourth) control device may serve as well for that purpose, controls the opening of the bottom of the receptacle 12. Said second control device 19 preferably also controls the order of functioning of the first and second conveyors 11 respectively 3, so that the supply of the sorts of feed can take place quickly.

There are provided identification means 7 for identifying an individual animal. In the embodiment shown the identification means 7 are disposed on the framework 1, but it Will be obvious that the identification means can also be disposed at other places, such as for example the feed troughs 6. With the aid of the identification means 7 the presence of an animal at the feed trough is automatically detected, and the identity of an animal present at a feed trough 6 is automatically established. With the aid of data stored in the memory of for example the second control device 19, the amounts of sorts of feed intended for that animal can then be supplied in a particular ratio and/or order. With the aid of a weighing device 20 known per se the amount conveyed to the receptacle 12 by the first conveyor 11 can then be checked. The second control device 19 further controls, with the aid of data from the computer 8 and the animal identification means 7, the movement of the tube-shaped chute 3 so that the latter is located just over the correct feed trough 6. The second control device 19, under control of the computer 8, further controls the drive of the conveyors 11.

Figure 2:
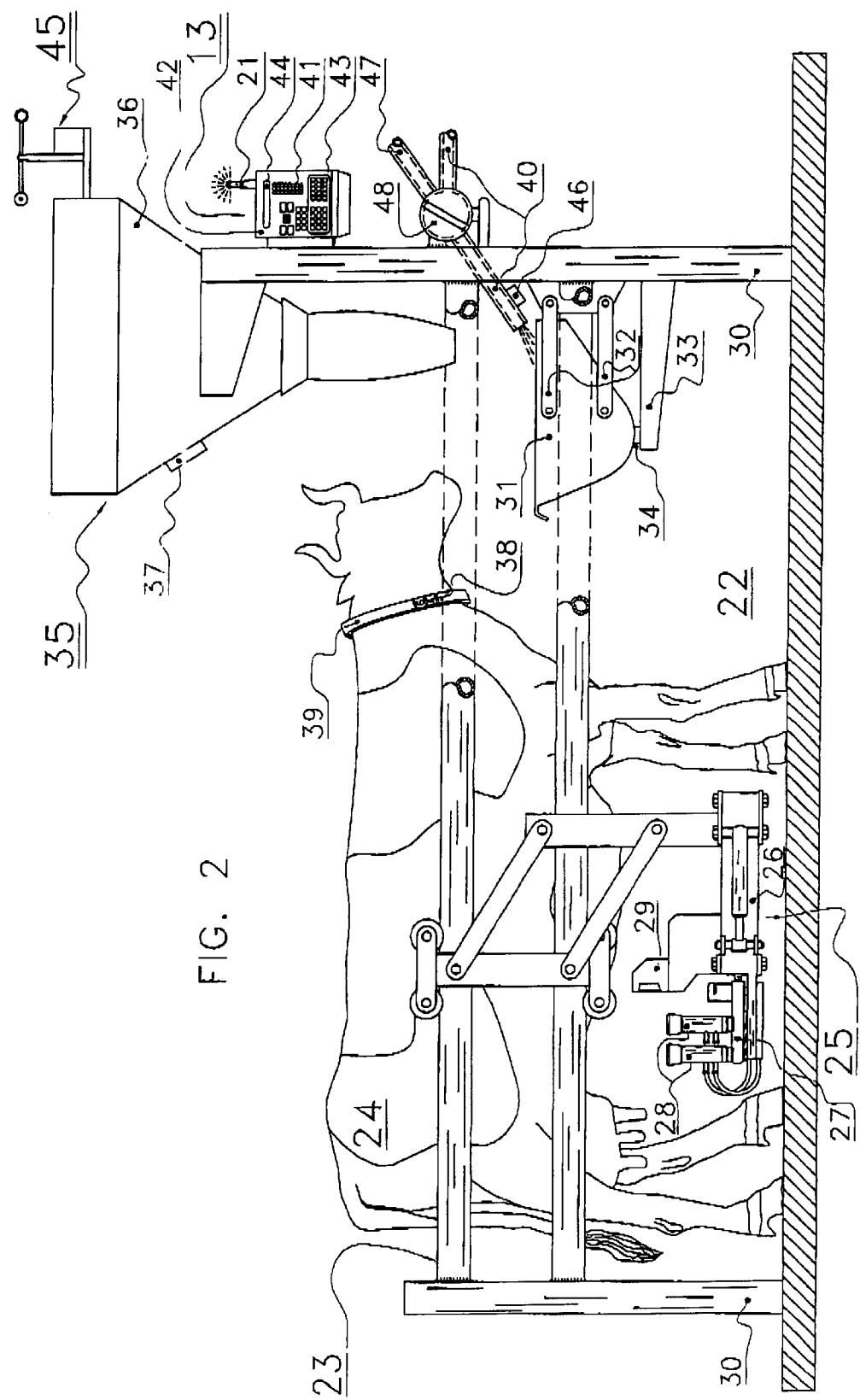
FIG. 2 is a schematic side view of an embodiment of a device according to the invention in the form of a milking box.

FIG. 2 is a side view of an embodiment of a device according to the invention in the form of a milking box 22. The milking box 22 comprises a fencing 23 disposed near the circumference of a cow 24 during her stay in the milking box 22. On one side of the milking box 22 there is disposed a milking robot 25. The milking robot 25 comprises for example a robot arm 26 having at its end teat cups 28 supported by a carrier 27. On the robot arm 26 near the teat cups 28 there is further disposed a sensor 29 with the aid of which the position of the teats of a cow to be milked can be determined.

Near the front side of the milking box 22 a feed trough 31 is fastened to a post 30. In the embodiment shown the feed trough 31 is connected with a post 30 by means of a parallelogram hinge construction 32. The feed trough 31 is supported at its lower side by a supporting beam 33. Between the supporting beam 33 and the lower side of the feed trough 31 there is further disposed a measuring device 34 by means of which the weight of the feed trough 31 with contents can be determined. In the present embodiment the measuring device 34 comprises a piezo-element. It will be obvious that the invention is not limited to this specific manner in which the contents of the feed trough can be measured, and hereinafter some alternative ways of determining the weight of the feed trough with contents will be described.

Over the feed trough 31 there is fitted to the post 30 a feeding station 35 comprising a number of hoppers (not shown in the drawing), each for containing one sort of feed, and a tube-shaped chute (analogously to the feeding column as described above). The feeding station 35 comprises a reservoir 36 surrounding the hoppers for the sorts of feed. Against the outer wall of the reservoir 36 there is disposed a receiver 37 constituting part of (non-shown) identification means. The receiver 37 can receive the signals from a transmitter 38 disposed for example on a collar 39 around the neck of the cow 24. It will be obvious that different sorts of identification means are applicable in the invention and that the invention is not limited to one sort of identification means. The receiver and the transmitter may further be disposed at different places. The receiver may be disposed for example on the feed trough 31 and the transmitter may be implanted in the cow.

Near the upper side of the feed trough 31 there is further fitted to the post 30 a liquid supplying device 40, for example a sprayer, with the aid of which an amount of liquid, for example water, or a viscous liquid, such as syrup or treacle, can be added to the feed present in the feed trough 31.

The device operates as follows:

After the cow 24 has entered the milking box 22 and the transmitter 38 has come into the receiving range of the receiver 37, the cow 24 is automatically identified by the identification means. Per cow data in relation to the sorts of feed and the amount thereof offered to a relevant cow per feeding are stored in a manner known per se in a memory 41 of a computer 42 belonging to a first control device 13. The first control device 13 as controlled by the computer 8 which is for example connected in a wireless manner with the first control device 13. For that purpose each control device as well as the computer are provided with a transmitter-receiver 21, 21'.

When a cow 24 has been identified, the identification means send a signal to the computer 42 which, with the aid of the data stored in the memory 41, controls the feeding station 35 in such a way that an amount and ratio of sorts of feed belonging to the cow 24 are supplied possibly in a particular order.

Besides, the amount of feed consumed by a cow can be optimised further by adding an amount of liquid to a sort of feed by means of the liquid supplying device 40. What should be the amount of liquid to be added per cow per sort of feed is determined per cow with the aid of data in the memory 41 of the computer 42 Said data contain per cow a relation between the intake of the sort of feed and the added amount of liquid for obtaining for example a desired milk production. Thus, after a cow 24 has been identified, the computer 42 issues a signal to the liquid supplying device 40 for supplying the relevant amount of liquid. For that purpose the computer 42 uses the relevant data from the memory 41.

For the first use of the device according to the invention these data can be inputted into the memory 41 by making use of inputting means, such as a keyboard 43. This can be done by a farmer who inputs values per cow and per sort of feed according to his experience. For facilitating the input and for checking the functioning of the device during the use thereof, the computer 42 comprises a display screen 44.

The feeding station preferably comprises measuring means 45 for measuring the atmospheric conditions, such as temperature air humidity, atmospheric pressure, wind speed and the like. The data in the memory 41 can contain per cow a relation between the amount of liquid to be added per sort of feed depending on the environmental conditions, which relation leads to a desired feed intake.

Thus in the embodiment described, after a visit of a cow to the milking box the following data are stored in the memory: the amount consumed per sort of feed, the amount of liquid added per sort of feed, the temperature, the air humidity, the atmospheric pressure, the wind speed, and the milk yield, and possibly the order of sorts of feed supplied. When a cow has consumed all the feed supplied, said data are processed by the computer into the memory, so that at a next visit of the cow under the same circumstances the same amounts of liquid can be added to the sorts of feed.

When the cow has not consumed all the feed, at the next visit of the cow to the milking box it is possible to change the amount of liquid which is added to the sorts of feed or the ratio and amount in which the sorts of feed are offered themselves. For changing the amount of liquid to be added different approaches can be made. For example, the amount of liquid to be added can be increased at the next visit by 5% (another increase, or even decrease, is also possible, of course), after which the amount of feed consumed is measured. Accordingly, the amount of liquid is changed automatically per visit of the cow to the milking box until the cow has eaten up the entire amount of the sort of feed supplied. In the latter case the data are recorded by the computer in the memory as standard values. Otherwise, they are stored temporarily, for providing the possibility of determining the standard values. The computer can then be programmed such that certain data are given priority for determining the amount of liquid to be added. An example of a priority order is: amount consumed of the sort of feed, milk yield, air humidity, temperature, atmospheric pressure, wind speed. Of course, another order, in dependence on the wishes of the farmer, is possible as well. Thus there is provided an iterative way of determining the amount of liquid to be added for obtaining the optimal feed intake. This supply of feed by adding liquid can also be used for the feeding column. It will further be obvious that adding or determining the order of supply of sorts of feed takes place analogously to adding liquid.

The liquid supplying device 40 may be provided with a heating device or cooling device 46 for the liquid, bringing the liquid at a temperature suitable for optimal feed intake and possibly making the viscous liquid better processable. The operation of the heating/cooling device 46 can also be controlled by the computer 42 with the aid of data from the identification means and the data from the memory 41.

The device is provided with an additive device 47 for adding additives to the feed. Said additive device can he controlled by the computer 42 which controls for example a valve 48 in dependence on data from the identification means and data from the memory 41. As a result thereof for each cow individually particular additives, such as medicines, vitamins, fish oil, salts, minerals, and the like, can automatically be added to the feed.

By means of the measuring device 34 it is further determined how much feed a relevant cow has consumed during the feeding time. The amount of the sort of feed and the amount of Liquid added can also be determined separately. These data an be used for continuously updating the data in the memory and possibly adapting them to a changing eating behaviour of the cow.

As mentioned in the foregoing, some alternatives for determining the weight of a feed trough, in particular of the amount of feed present therein, will now be described.

Figure 3:
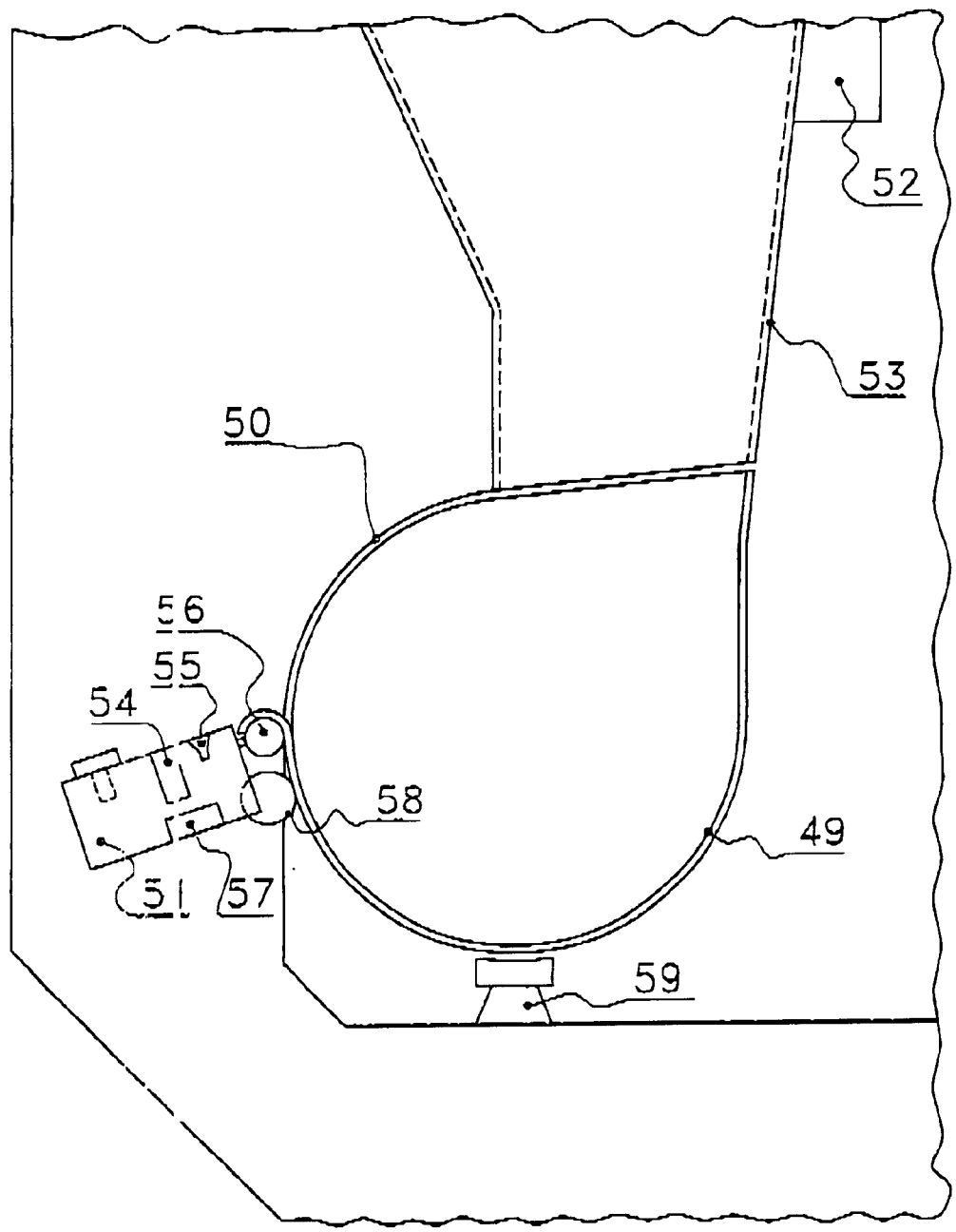
FIG. 3 shows a first embodiment of means for measuring the amount of a sort of feed consumed by an animal in a feeding column respectively a feeding station according to the invention.

FIG. 3 shows schematically a first embodiment of a feed trough 49 for containing feed. An entrance opening 50 gives an animal, for example but not exclusively a cow, access to the feed trough 49. An identification means known per se, i.e. an animal identification device 51, is disposed near the feed trough 49 and recognises a particular animal approaching the feed trough 49 and wishing to make use of it. With the aid of data from the animal identification device 51, a control device 52 supplies an amount of a particular sort of feed to the feed trough 49, the amount of said sort of feed falling into The feed trough 49 via for example a tube-shaped chute 53.

By weighing the amount of the sort of feed present in the feed trough, it can be determined how much of a particular sort of feed is consumed by a particular animal, and also whether remaining feed is present in the feed trough. The means for weighing the feed present in the feed trough are preferably connected with the control device for supplying, with the aid of data both from the animal identification device and the means for weighing, an amount of a sort of feed to the feed trough, while the amount of a sort of feed left by the previous animal can thus be taken into account.

In FIG. 3 the means for weighing the feed present in the feed trough 49 comprise a feed trough 49 which is pivotable about a pivot axis 56. The degree of pivoting is determined by the weight of the feed present in the feed trough 49. There is provided a device 57 for determining the degree of pivoting of the feed trough 49, and for deducing therefrom the weight of the feed present in the feed trough 49. The device 57 for determining the degree of pivoting of the feed trough 49 comprises a measuring roll 58 being in contact with the feed trough. From the degree of rotation of the measuring roll 58 the degree of pivoting and thus the amount of feed in the feed trough 49 can be determined.

Because of the fact that the device 57, 58 for determining the degree of pivoting of the feed trough 49 is integrated in the animal identification device 51, there is obtained a compact construction.

Figure 4:
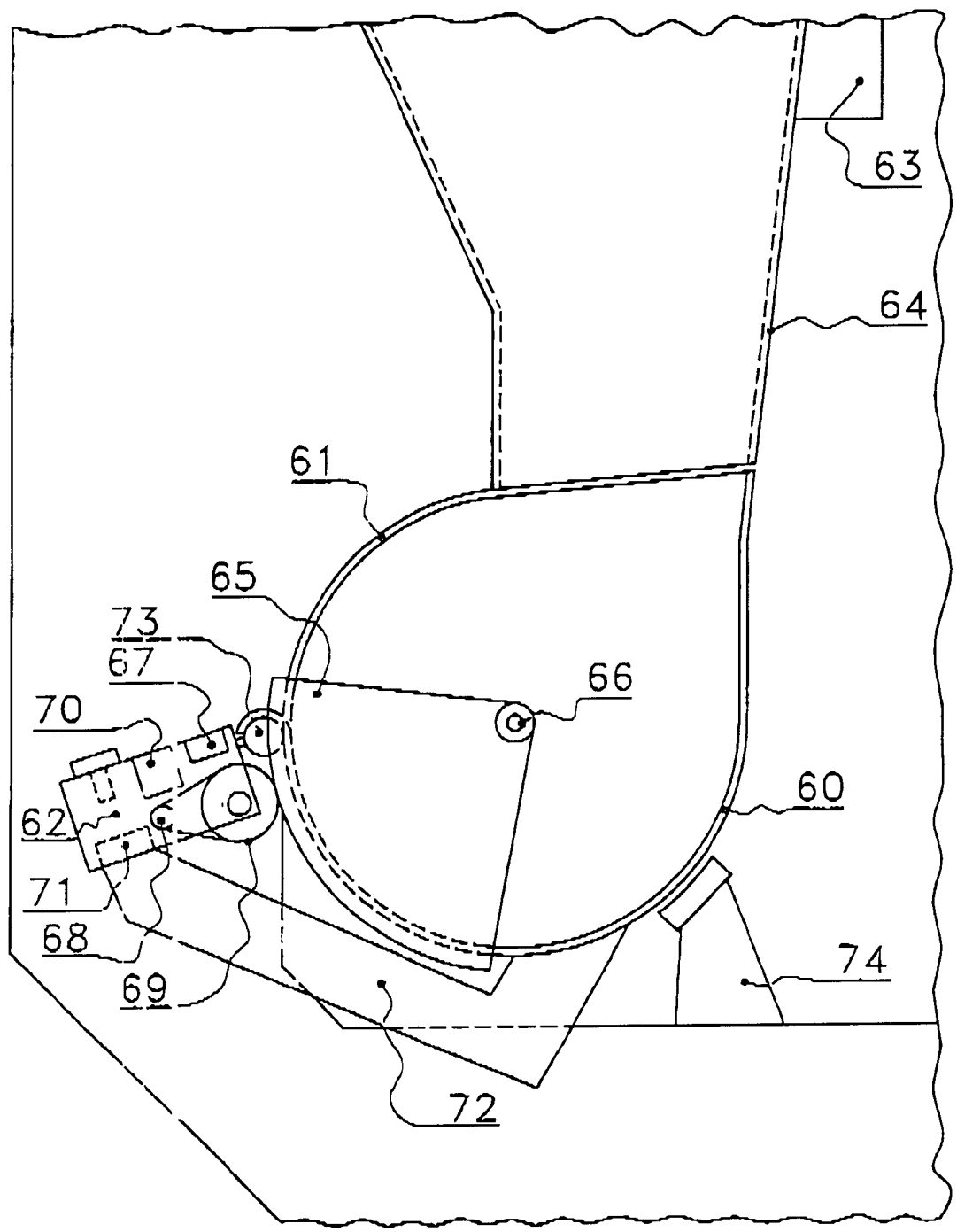
FIG. 4 shows a second embodiment of means for measuring the amount of a sort of feed consumed by an animal in a feeding column respectively a feeding station according to the invention.

Alternatively or additionally, as shown in FIG. 4, the pivoting determination device 70 for determining the degree of pivoting of the feed trough 60, and for deducing therefrom the weight of the feed present in the feed trough 60, may comprise a dynamometer 71. In the embodiment shown, the feed trough 60 bears on the dynamometer 71 via a supporting arm 72. In this situation the feed trough 60 pivots about a pivot axis 73. The dynamometer 71 is preferably included in the animal identification device 62.

In the embodiments shown in FIGS. 3 and 4, even small differences in weight can be measured, because the pivot axis 56, 73 and the measuring roll 58 respectively the dynamometer 71 are located at a small distance from each other.

For preventing in undesired cases of malfunction, for example when the animal pushes the feed trough downwards with force, the measuring roll, the dynamometer or the like from being damaged, in both embodiments there may be provided a safety support cam 59 (FIG. 3) respectively 74 (FIG. 4) for supporting the feed trough 49; 60.

Figure 5:
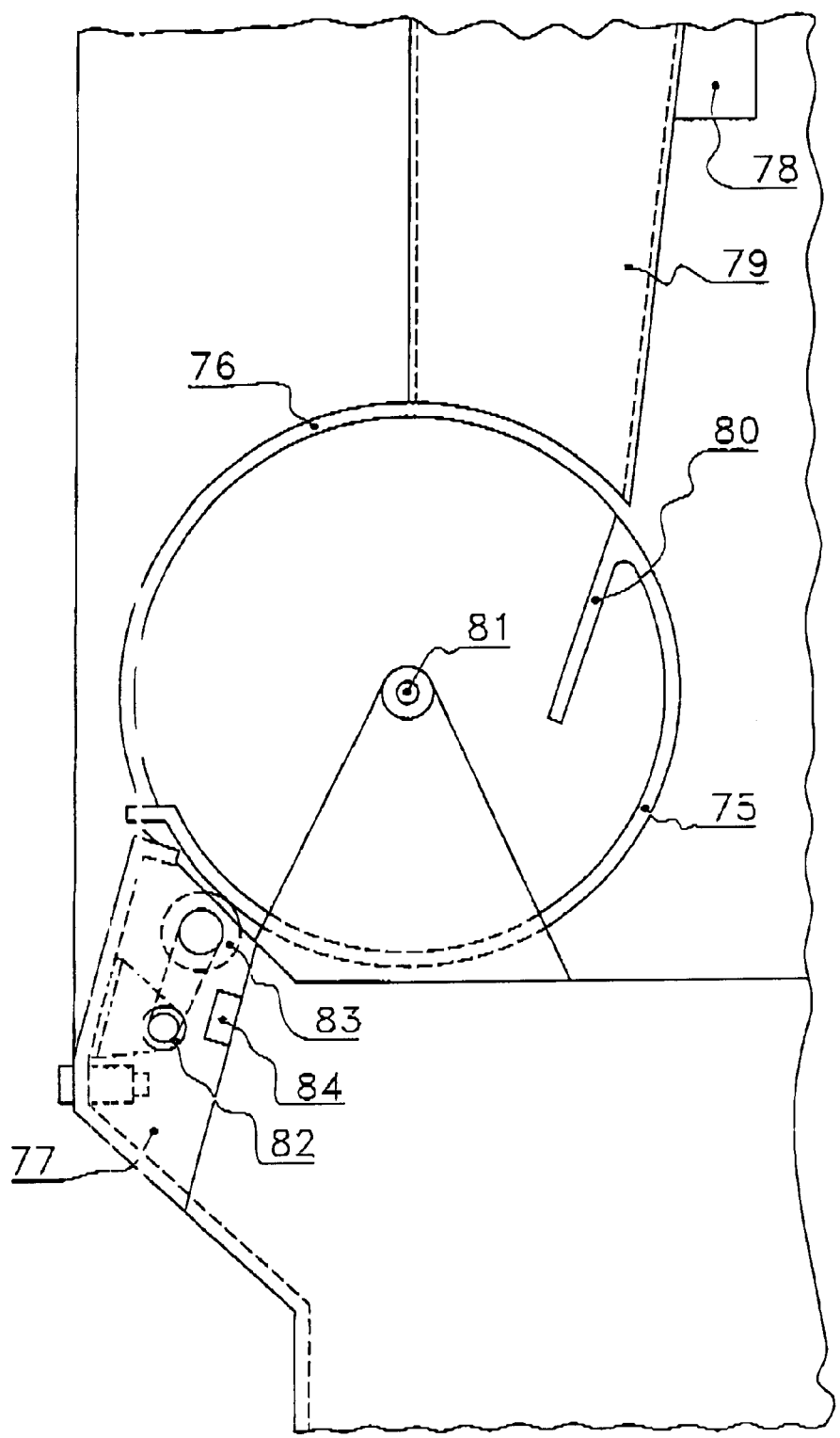
FIG. 5 shows a third embodiment of means for measuring the amount of a sort of feed consumed by an animal in a feeding column respectively a feeding station according to the invention.

In the third embodiment, as shown schematically in FIG. 5, the means for weighing the feed present in the feed unit comprise a movable feed trough 75. The feed trough 75 is moved in a reciprocating manner by the motor 82 by which the roll 83 is driven. As a result of this movement there is created a torque whose magnitude is determined by a device 84 for measuring the magnitude of the torque. From the torque determined the device 84 deduces the weight of the amount of a sort of feed present in the feed trough. The exact correlation between torque and amount of feed can previously be determined by simple calibration tests.

The embodiment according to FIG. 5 has a compact construction because of the fact that the motor 82 for moving the feed trough 75, and the device 84 for measuring the magnitude of the torque during moving and for deducing the weight of the amount of the sort of feed present in the feed trough 75 from the measured magnitude of the torque, are integrated in the animal identification device 77.

The feed trough may be provided with means for holding back an animal wishing to make use of the feed trough at an undesired point of time, or preventing that animal from making further use of the feed trough (for example for the remaining sorts of feed) or making further use of the feed trough impossible for that animal, with the aid of data from the animal identification device. As a result thereof it is possible to deter in a simple, efficient and cheap manner, animals which are not eligible to be fed from putting their heads into the feed trough, and to teach an animal first to eat up the sort of feed present in the feed trough before another sort of feed is offered.

In the first embodiment shown in FIG. 3, the means for holding back an animal comprise a loudspeaker 55 for issuing an animal-deterring sound. Alternatively or additionally the means for holding back an animal may comprise a lighting device 54 for producing an animal-deterring light. In particular when several feed troughs are juxtaposed, the use of deterring light is desirable, because this light can be focussed such that it only produces en effect on one particular feed trough.

In the second embodiment according to FIG. 4, the means for holding back an animal comprise a closing means 65 which is movable across the entrance opening 61. When the closing means 65 is moved across the entrance opening 61, the contents of the feed trough 60 can be made inaccessible to a particular animal. In the embodiment shown the closing means 65 is constituted by a vessel-shaped element capable of rotating about an axis 66. Said axis 66 may be constituted by a motor-driven axis, said motor being controlled with the aid of data from the animal identification device 62.

Additionally there may be provided a voltage supplying device 67 for supplying an animal-deterring electric tension to the closing means 65. Animals approaching the feed trough 60 undesirably often make contact with the feed trough 60. They will in particular touch the closing means 65 with their noses. By connecting precisely those components of the feed trough that are regularly touched by animals with the voltage supplying device 67, it is possible to deter a particular animal very locally. Accordingly, such a voltage supplying device 67 can also be used per se independently of a closing means.

The second embodiment also comprises a control device 63 and a tube-shaped chute 64 for the feed.

The devices described can be designed extremely compactly when the means for holding back an animal are integrated in the animal identification device. Alternatively the means for holding back an animal may be separate means.

In the third embodiment according to FIG. 5, the closing means is constituted by the feed trough 75 itself which is designed movably. In the shown situation the feed trough 75 is rotatably disposed about an axis 81, which axis 81 may be constituted by a motor-driven axis, said motor being controlled by the animal identification device.

In order to prevent that, in the position in which the feed trough 75 closes the entrance opening 76, feed falls from the feed trough 75, the feed trough 75 is provided with a wall portion 80 for catching remaining feed. Said wall portion 80 can also act as a feed guiding means for feed supplied through the tube-shaped chute 79 to the feed trough 75.

As described, in the second and third embodiment there is provided a simple but reliable construction due to the fact that the closing means rotates about an axis, the closing means being driven by a motor controlled by the animal identification device. For the purpose of providing, besides a simple but reliable construction also a compact construction, a roll 69 respectively 83 is preferably driven by a motor 68 respectively 82, said roll 69, 83 being in contact with the closing means 65 respectively 75. In the third embodiment the feed trough 75 thus bears on the animal identification device 77 via the roll 83.

Although for the roll 83 a separate torque roll may be used, it is preferred when the roll 83 performs both the function of driving the closing means, in this case the feed trough 75 itself, and the function of torque roll respectively measuring roll. Of course, in the alternative case in which the feed trough 75 is moved by the axis 81 driven by a motor, the torque can also be measured via that motor.

The fourth embodiment, as shown in FIG. 6, comprises both means for holding back an animal wishing to make use of the feed trough 85 with the aid of data from the animal identification device 87, and means for weighing the feed present in the feed trough 85.

The means for holding back are constituted by a separate closing means 91 which is rotatable about an axis 90. The closing means 91 is set in rotation by a roll 92, capable of coming into contact with the closing means 91, and is driven by a motor 93 which is controlled by the animal identification device 87. Due to this it is possible for example to refuse access to a feed trough to an animal jostling another animal from that feed trough.

In this embodiment the weighing means are constituted by a feed trough 85 which is rotatable about an axis 94. The feed unit 85 can be brought into contact with the roll 92, and is subject to a reciprocating movement by correct operation of the motor 93 by which the roll 92 is driven. By the movement of the feed trough 85 there is generated a torque which can be measured by the torque measuring device 95.

In the situation shown in FIG. 6 the roll 92 makes contact with the feed trough 85 and the latter can be set in motion for determining the amount of sort of feed present in the feed trough 85. After an animal has consumed the sort of feed, the amount of remaining sort of feed can be determined by torque measurement. Then the roll 92 is controlled by the motor 93 in such a way that it partially covers the entrance opening 86. A catching device 96 on the feed trough 85 takes along the closing means 91 until the latter comes into contact with the roll 92. Then the roll 92 controls the closing means 91 in such a way that it covers the entire entrance opening 86. As a result of the fact that the feed trough 85 is no longer in contact with the roll 92, the feed trough 85 falls back to the starting position in which a next sort of feed can possibly be supplied via the tube-shaped chute or channel-shaped chute 89.

The fifth embodiment according to FIG. 7 differs from that of FIG. 6 by the location of the pivot axis 104 about which the feed trough 97 rotates. The pivot axis 104 is disposed close to the roll 101 for driving the feed trough 97 and measuring the torque, for measuring very small differences in amount of feed. There is also provided a stop 103 for preventing superfluous movement of the feed trough 97. The closing means 100 for closing the entrance opening 98 pivots about the axis 102.

According to the invention, the supply of sorts of feed to a feed trough in a particular order and/or amount and ratio is performed in dependence on a feed composition per unit of time. To that end the computer 8 stores in its memory the point of time of supply of feed measured by the clock. The calculating device of the computer 8 divides the predetermined amount of sort of feed by the predetermined period (for example one day, or the period in which a particular number of cows (for example 40) has visited the feeding parlour) spread over which period the predetermined amount of feed has to be supplied, resulting in the so-called sort-of-feed quotient. The feed composition is determined in that the computer 8 measures the sub-period between the last supply of feed to an animal and the point of time when the animal is again detected at the feed trough by the animal identification means, and in that the computer multiplies said sub-period by the sort-of-feed quotient resulting in a feed balance. Said feed balance is supplied to the animal under the control of the computer 8. The sub-period may be for example 8 cows (the number of cows having visited the feeding parlour since the last feeding of the relevant cow) or a time interval of for example 5 hours since the last feeding of the relevant cow.

An example of such a feed composition will be elucidated with reference to FIG. 8. In this figure the feed composition for a particular cow is shown, the sorts of feed being the following four sorts of feed: concentrate, ensilaged grass, maize and brewer's grains. However, it will be obvious that other sorts of feed can be added and/or particular sorts of feed can be replaced by other sorts of feed. The predetermined amounts of sorts of feed supplied to the cow per 24 hours are: 12 kg concentrate, 24 kg ensilaged grass, 6 kg maize and 3 kg brewer's grains. (Alternatively the predetermined amounts of sorts of feed supplied to the cow may be: 12 kg concentrate, 24 kg ensilaged grass, 6 kg maize and 3 kg brewer's grains over a period in which 40 cows visit the feeding parlour). As portion size 5% of the feed balance is taken, which can be calculated by the calculating device of the computer 8. Depending on the size of the feed trough, there can be determined a maximum, for example 2 kg, for the feed portion. There is further chosen a minimum portion size of 200 grams. It will be obvious that in dependence on the size of the device and the measurement accuracy other values can be taken. At the moment when 5% of the teed balance is less than 200 grams (the minimum portion size), the minimum portion size is supplied to the feed trough.

A cow which has just reported, always gets a first portion which is equal to the minimum portion size; this serves to verify whether the cow actually wishes to eat. When after comparison by a comparing device of the computer the comparison result indicates that the calculated feed portion size for a particular sort of feed is smaller than the minimum feed portion size for that sort of feed, the computer controls the device in such a way that one minimum feed portion size composed of the other sorts of feed is supplied to the animal.

In FIG. 8 the upwardly extending flanks show the linear feed composition per sort of feed. At the point of time when a cow reports the feed composition obtained, as calculated by the computer, is supplied to the cow in portions, and the increase changes into a decrease. Said decrease can continue until the minimum of the sort of feed (or a minimum of the total of the sorts of feed to be offered) has been attained. In the case shown in the figure the total minimum is −5 kg, so that the cow can consume slightly more than the amount to be supplied over 24 hours (or the particular number of cows, which can simply be determined by a counter).

At the point of time when a cow leaves the feed trough there may still be present an amount of remaining feed. Both said remaining feed and the surplus of feed consumed as a result of a negative minimum are taken into account in the further course of the feed composition. The composition takes place up to a maximum per sort of feed or a total maximum. A possible replenishment of a feed trough is taken into account by the computer by making use of a comparing device for comparing the amount of remaining feed with a minimum threshold value, the computer only controlling the device for supplying a sort of feed to the feed trough when the comparison indicates that the amount of remaining feed is below the minimum threshold value.

In FIG. 8 the blocking period (for example a minimum number of cows that has to visit the feeding parlour) or a blocking time is not shown, but can for example be fixed at 30 minutes, which implies that within the blocking time after a supply of feed at which a cow has eaten, said cow is not admitted to the feed trough. Also when the cow is expected at the milking box within half an hour, the access will be refused. The relevant points of time, such as the point of time of supply of feed or the point of time when the animal leaves the feed trough (after having eaten or not) are stored.

According to the invention there can further be provided variation in the offered feed in that the computer 8 controls the relevant components in such a way that the amount of a sort of feed to be supplied to the relevant feed trough 6, 31, 49, 60, 75, 85, 97 depends on the measured values of relevant variable parameters. For example, depending on the measured value more concentrate and ensilaged grass, but less maize and brewer's grains can be supplied. On the other hand, under changing circumstances more ensilaged grass, and less maize, concentrate and brewer's grains can be supplied. It will be obvious that the amount per sort of feed is controlled by the computer.

The ratio and amounts are also determined in dependence on the preferences, the environmental conditions respectively in dependence on the desired economic results.

It has been found for example that one cow prefers brewer's grains to other sorts of feed, whereas another cow prefers concentrate and finds brewer's grains not tasty at all. The invention may be advantageous to prevent that the latter cow, just because brewer's grains is present in the offered feed, consumes less than desirable. For example, in that situation, when brewer's grains does not contain a nutritive ingredient that the other sorts of feed do contain, brewer's grains is not offered to that cow. When that cow needs an ingredient that is only present in brewer's grains, the computer is capable of controlling the relevant components in such a way that the composition of the mixture is such that the cow still consumes the brewer's grains. Such a control by the computer can take place due to the fact that such data are stored in the memory of the computer.

It has further been found that in humid circumstances cows prefer drier feed mixtures, so that in that case more dry ensilaged grass, and less of the wetter concentrate has to be supplied.

The atmospheric-condition-measuring means described above can then ensure an automatic adaptation of the ratio and/or amount, in dependence on the measured temperature, humidity, atmospheric pressure, wind speed and the like.

Like with human beings, the optimal feed intake of a cow may depend on the point of time of the day, and thus it is possible to distinguish for example breakfast, lunch and dinner. Also these data may be included in the memory. When a clock, which is not explicitly shown in the drawings but is implicitly present in the computer, indicates the point of time of the day and issues a corresponding time signal to the computer, the point of time of the day can automatically be taken into account. It has further been found that there is per cow a season-dependence in the ratio and amount of sorts of feed offered ensuring an optimal intake, which can automatically be taken into account by means of the clock.

Besides, the eating rate (from which the preference, respectively taste of the animal can be deduced), the milk yield, and the amount of energy and/or protein and/or fat and/or minerals and/or amino acids, and the like present in the milk produced by a cow appear to be suitable for being used as data in the memory for controlling the ratio and amount of the sorts of feed to be supplied.

Such data, analogously to what has been described above in relation to adding liquid, can be inputted into the computer by means of the keyboard or another comparable inputting device for inputting data into the memory. Such data can also automatically be generated by the computer itself, by providing variation in the sorts of feed to be offered and by determining the feed intake resulting therefrom, respectively the economic result resulting therefrom, and by automatically varying the offered feed in dependence on the result. This feed back can also take a developing animal into account.

Because a number of data can be used by the computer for generating the control signal, there can also be provided a priority algorithm, as a result of which, on determining the order of sorts of feed to be offered, one data (for example air humidity) is given priority over another data (such as eating rate) when generating the control signal. Moreover, weight factors can be allotted to the various data, so that it is possible to take several data into account simultaneously. Such programs and algorithms are known per se to the person skilled in the art.

According to the invention, additionally or alternatively there can be provided variation in the offered feed in that the computer 8 controls the relevant components in such a way that at least one sort of feed is supplied at least substantially separately from the other sorts of feed to the relevant feed trough 6, 31, 49, 60, 75, 85, 97. Thus the order in which the sorts of feed are offered to the cow can be varied. For example the order may be: concentrate, ensilaged grass, and a mixture of maize and brewer's grains, but may also be: ensilaged grass, a mixture of maize and concentrate and separately brewer's grains. Besides, all sorts of feed can also be supplied at least substantially separately, of course. It will be obvious that the amount per sort of feed is also controlled by the computer.

The control signal issued by the computer can control the device in such a way that the order in which sorts of feed are supplied to the feed trough separately from each other is completely arbitrary, so that each time when the cow arrives at the feed trough it is a surprise which sort of feed is supplied first.

However, the order can also be determined in dependence on the preference of the relevant cow, respectively in dependence on the environmental conditions, respectively in dependence on the desired economic results.

It has been found for example that one cow prefers brewer's grains to other sorts of feed, whereas another cow prefers concentrate and does not find brewer's grains tasty at all. The invention may be advantageous to prevent that the latter cow, just because brewer's grains is present in the offered feed, consumes less than desirable. For example, in that situation, when brewer's grains does not contain a nutritive ingredient that the other sorts of feed do contain, brewer's grains is not offered to that cow. When that cow needs an ingredient that is only present in brewer's grains, the computer is capable of controlling the relevant components in such a way that brewer's grains is offered as the first sort of feed. At this point of time, before the cow begins to eat, she has the most appetite and will earlier be inclined still to consume her portion. This can be stimulated in particular due to the fact that the computer offers, after the brewer's grains, the sort of feed which that cow finds the tastiest one. Such a control by the computer can take place because of the fact that such data are stored in the memory of the computer.

Because the number of possible combinations between data per cow is extremely large, for the sake of simplicity of the description it is impossible to describe the possible combinations. With the aid of the above-mentioned information it is possible for a person skilled in the art to obtain, depending on his/her wishes, the desired amounts and ratios of sorts of feed to be offered by means of simple trial and error tests. It will further be obvious that the functioning and control of components of the feeding column can also be applied to the feeding station and vice versa. Although the invention is described with reference to an embodiment in which the computer is provided with a calculating device for making a division of the predetermined amount of sort of feed by the predetermined period resulting in a sort-of-feed quotient, and in which the calculating device determines the product of the sub-period and the sort-of-feed quotient resulting in the feed balance, it will be obvious that other embodiments in which a feed balance is determined with the aid of the sub-period are possible. The computer may in particular be provided with a memory in which are stored correspondence tables containing the size of the feed balance per animal per sub-period.

What is claimed is:

1. A device for automatically supplying a predetermined amount of at least one sort of feed to an animal in a period having a predetermined length, the device being provided with a feeding parlour, with animal identification means for identifying an animal present at the feeding parlour, with a computer for controlling the device for automatically supplying the at least one sort of feed to the feeding parlour, characterized in that the computer is suitable for determining the sub-period between the last supply of feed to an animal and the momentary point of time when the animal is identified by the animal identification means at the feeding parlour, and in that the computer controls the device in such a way that during the momentary visit of the animal to the feeding parlour there is supplied a feed balance to the animal, the size of said feed balance depending on the determined sub-period.

2. A device as claimed in claim 1, characterized in that the device is suitable for automatically supplying the predetermined amount of at least one sort of feed in a period of time having a predetermined length, the computer being provided with a clock for determining per animal the point of time of supply of feed, the computer being suitable for determining the sub-period as being the time interval between the last supply of feed to an animal and the momentary point of time when the animal is identified by the animal identification means at the feeding parlour.'

3. A device as claimed in claim 2 characterized in that the clock measures the momentary point of time when an animal is present at the feed trough, and in that said predetermined period of time immediately precedes the momentary point of time.

4. A device as claimed in claim 1, characterized in that the computer is provided with a memory in which are stored correspondence tables containing the size of the feed balance per animal per sub-period.

5. A device as claimed in claim 1, characterized in that the computer is provided with a calculating device for making a division of the predetermined amount of sort of feed by the predetermined period resulting in a sort-of-feed quotient, and in that the calculating device determines the product of the sub-period and the sort-of-feed quotient resulting in the feed balance.

6. A device as claimed in claim 5, characterized in that the computer controls the device in such a way that the feed balance is supplied to the animal in feed portions.

7. A device as claimed in claim 6, characterized in that each feed portion of said feed portion has at least a minimum feed portion size.

8. A device as claimed in claim 7, characterized in that the computer is provided with a comparing device for comparing each calculated feed portion size with the minimum feed portion size, while, when the comparison result indicates that a said calculated feed portion size is smaller than the minimum feed portion size, the computer controls the device in such a way that at least one minimum feed portion size is supplied to the animal.

9. A device as claimed in claim 7, characterized in that, when the animal is identified by the animal identification means at the feeding parlour, the computer controls the device in such a way that first one minimum feed portion size is supplied to the animal.

10. A device as claimed in claim 6, characterized in that a calculating device of the computer calculates feed portion sizes for the feed portions.

11. A device as claimed in claim 10, characterized in that the calculated minimum feed portion size is approximately 5 % of the feed balance.

12. A device in accordance with claim 1, characterized in that there is included a blocking period in the memory, the computer only controlling the device for supplying the at least one sort of feed to the animal, after, counted from the last point of time of supply of feed to the animal, the blocking period has elapsed.

13. A device as claimed in claim 1, characterized in that the memory of the computer ther is included a minimum and a maximum for the amount of a sort of feed to be supplied.

14. A device as claimed in claim 1, characterized in that the computer stores the points of time when an animal leaves the feed trough in a memory.

15. A device as claimed in claim 1, characterized in that the device is provided with measuring means for measuring the weight of the feed in the feeding parlour.

16. A device as claimed in claim 15, characterized in that the computer stores data in relation to the amount of remaining feed present in a feeding parlour in the memory.

17. A device as claimed in claim 16, characterized in that the calculating device determines the feed balance as being the product of the sub-period and the sort-of-feed quotient, said product being reduced by the amount of remaining feed.

18. A device as claimed in claim 15, characterized in that the computer is provided with a comparing device for comparing the amount of remaining feed with a minimum threshold value, the computer only controlling the device for supplying a sort of feed in the feeding parlour when the comparison indicates that the amount of remaining feed is below the minimum threshold value.

19. A device in according with claim 1, characterized in that the device is suitable for automatically supplying several sorts of feed to an animal in a predetermined period.

20. A device as claimed in claim 19, characterized in that the device is provided with a mixing device for mixing the sorts of feed before these sorts of feed are supplied to the feeding parlour.

21. A device as claimed in claim 19, characterized in that the computer controls the device in such a way that at least one sort of feed is supplied to the feeding parlour at least substantially separately from the other sorts of feed.

22. A device as claimed in claim 1, characterized in that when the comparison result indicates that the calculated feed portion size for a particular sort of feed is smaller than the minimum feed portion size for that sort of feed, the computer controls the device in such a way that one minimum feed portion size, composed of the other sort of feed, is supplied to the animal.

23. A device as claimed in claim 1, characterized in that the device is provided with several feeding parlours, and in that the computer controls the device in such a way that first feed is supplied to that feeding parlour where an animal has been identified most recently by the animal identification means.

24. A device as claimed in claim 1, characterized in that the device is provided with at least one milking compartment with a milking robot for automatically milking a dairy animal, the milking compartment being provided with a feeding station with a feed trough.

25. A device as claimed in claim 24, characterized in that the feeding station is suitable for automatically supplying at least two sorts of feed, in that the device is provided with parameter-measuring means for measuring a momentary value of a variable parameter and for issuing a parameter value signal to the computer, the computer controlling the feeding station by means of a control signal in such a way that sorts of feed are supplied to a particular amount and in a particular ratio as a mixture, the computer being provided with a processing signal for processing the parameter value signal into the control signal.

26. A device as claimed in claim 25, characterized in that the parameter-measuring means are selected from the group composed of atmospheric-condition measuring means for measuring the atmospheric conditions, a clock for measuring the point of time of the day, a clock for measuring the period of the year, means for measuring the condition score of animal, means for determining per animal the eating rate per sort of feed, means for measuring per animal the milk yield, means for measuring the amount of protein, means for measuring the amount of fat, means for measuring the amount of minerals, and means for measuring the amount of amino acids or any combination thereof in the milk obtained from that animal, and means from measuring the amount of a sort of feed consumed by an animal.

27. A device as claimed in claim 1, characterized in that the device is provided with at least one feeding column with a feeding trough.

28. A device as claimed in claim 27, characterized in that the feeding column is suitable for automatically supplying at least two sorts of feed, in that the device is provided with parameter-measuring means for measuring a momentary value of a variable parameter and for issuing a parameter value signal in such a way that sorts of feed are supplied to a particular amount and in a particular ratio collectively as a mixture, the computer being provided with a processing device for a processing the parameter value signal into the control signal.

29. A device as claimed in claim 28, characterized in that the parameter-measuring means are selected from the group composed of atmospheric-condition measuring means for measuring the atmospheric conditions, a clock for measuring the point of time of day, a clock for measuring the period of the year, means for measuring the condition score of animal, means for determining per animal the eating rate per sort of feed, means for measuring per animal the milk yield, means for measuring the amount of protein or fat, or minerals, or amino acids or any combination thereof in the milk obtained from that animal, and means from measuring the amount of a sort of feed consumed by an animal.

30. A device a claimed in claim 1, characterized in that the device comprises feeding means which is provided with a receptacle, the conveying means comprising a first conveyor for conveying the amount of the feed from the hopper to the receptacle and a second conveyor for conveying the amount of feed from the receptacle to a feed trough.

31. A device as claimed in claim 30, characterized in that the receptacle is provided with a weighing device for measuring feed present in the receptacle period.

32. A device as claimed in claim 30, characterized in that the receptacle has a bottom part which is designed to be opened.

33. A device as claimed in claim 32, characterized in that the device is provided the control device for controlling the opening of the bottom part of the receptacle.

34. A device as claimed in claim 30, characterized in that said second conveyer consists of the tube or a channel.

35. A device as claimed in claim 30, characterized in that the feed trough comprises closing means suitable for controlling the operation of the closing means.

36. A device as claimed in claim 1, characterized in that said predetermined period is measured from a fixed point of time of the day.

37. A device as claimed in claim 1, characterized in that the predetermined length of the period is selectively animal-dependant or lactation-period-dependent or season-dependent or weather-dependent or a combination thereof.

* * * * *